(12) United States Patent
Liu et al.

(10) Patent No.: US 9,070,091 B2
(45) Date of Patent: Jun. 30, 2015

(54) METHOD FOR EXTRACTING CRITICAL DIMENSION OF SEMICONDUCTOR NANOSTRUCTURE

(71) Applicant: HUAZHONG UNIVERSITY OF SCIENCE AND TECHNOLOGY, Wuhan (CN)

(72) Inventors: Shiyuan Liu, Wuhan (CN); Jinlong Zhu, Wuhan (CN); Chuanwei Zhang, Wuhan (CN); Xiuguo Chen, Wuhan (CN)

(73) Assignee: HUAZHONG UNIVERSITY OF SCIENCE AND TECHNOLOGY, Wuhan (CN)

( * ) Notice: Subject to any disclaimer, the term of this patent is extended or adjusted under 35 U.S.C. 154(b) by 289 days.

(21) Appl. No.: 13/754,925

(22) Filed: Jan. 31, 2013

(65) Prior Publication Data

US 2013/0325760 A1  Dec. 5, 2013

(30) Foreign Application Priority Data

May 31, 2012 (CN) .......................... 2012 1 0177237

(51) Int. Cl.
G06N 5/00 (2006.01)
G06F 1/00 (2006.01)
G06N 99/00 (2010.01)

(52) U.S. Cl.
CPC .................................. *G06N 99/005* (2013.01)

(58) Field of Classification Search
CPC ........... G06N 5/04; G06N 5/02; G06N 5/048; G06Q 50/01
USPC ............................................................ 706/12
See application file for complete search history.

(56) References Cited

U.S. PATENT DOCUMENTS

| 8,108,324 B2* | 1/2012 | Krupka et al. ................... 706/12 |
| 2012/0023620 A1* | 1/2012 | Yau et al. ....................... 800/279 |
| 2012/0278659 A1* | 11/2012 | Han et al. ..................... 714/38.1 |

* cited by examiner

*Primary Examiner* — Alan Chen
*Assistant Examiner* — Kalpana Bharadwaj
(74) *Attorney, Agent, or Firm* — Matthias Scholl P.C.; Matthias Scholl

(57) ABSTRACT

A method for extracting a critical dimension of a semiconductor nanostructure. The method includes: 1) determining a value range for each parameter to be extracted, whereby generating an electronic spectra database, and employing training spectra and support vector machine (SVM) training networks for training of SVMs; 2) employing the SVMs after training to map measured spectra to yield a corresponding electronic spectra database; and 3) employing a searching algorithm to search for an optimum simulation spectrum in the corresponding electronic spectra database, simulation parameters corresponding to the simulation spectrum being the critical dimension of the semiconductor nanostructure to be extracted.

4 Claims, 6 Drawing Sheets

METHOD FOR EXTRACTING CRITICAL DIMENSION OF SEMICONDUCTOR NANOSTRUCTURE

CROSS-REFERENCE TO RELATED APPLICATIONS

Pursuant to 35 U.S.C. §119 and the Paris Convention Treaty, this application claims the benefit of Chinese Patent Application No. 201210177237.8 filed on May 31, 2012, the contents of which, including any intervening amendments thereto, are incorporated herein by reference. Inquiries from the public to applicants or assignees concerning this document or the related applications should be directed to: Matthias Scholl P.C., Attn.: Dr. Matthias Scholl Esq., 14781 Memorial Drive, Suite 1319, Houston, Tex. 77079.

BACKGROUND OF THE INVENTION

1. Field of the Invention

The invention relates to a semiconductor and optical scattering measurement field, and more particularly, to a method for extracting a critical dimension of a semiconductor nanostructure.

2. Description of the Related Art

For the purpose of implementing operability, repeatability, and extendibility of nano manufacturing process, and ensuring reliability, uniformity, and economical and large-scale production based on the nano technology, it is very important to perform fast, non-destructive, and low-cost measurement on 3D morphology parameters of structures, including feature linewidth (critical dimensions), height, cycles, sidewall angles and so on, during the nano manufacturing process.

In the semiconductor and optical measurement field, an optical scatterometer is the most popular-used device for measuring critical dimensions. Measurement of the optical scatterometer includes forward optical modeling and reverse seeking. Forward optical modeling is to perform optical scattering field simulation on geometric models of nano structures to be measured, whereby extracting simulation spectra. Reverse seeking includes continuously comparing the measured spectra with the simulation spectra, and parameters of a model corresponding to a simulation spectrum with the highest similarity are parameters of the nano structures to be measured. The most popular-used method during reverse seeking of the optical scatterometer is a library-matching-based method. The method includes: first constituting a simulation spectra database for a structure model to be measured, each independent spectrum in the database corresponding to a model determined by a parameter value, and searching for a simulation spectrum most similar to each measured spectrum in the database according to an evaluation function, a parameter value of a model corresponding to the simulation spectrum being that of the structure to be measured. However, the spectra database often includes large amount of simulation spectra, and the number of the spectra is to grow in a geometrical progression with increase of parameters of the nano structures, expansion of simulation parameters, and rise in requirement for accuracy of parameters to be extracted. To meet requirements for real-time feature and rapidity in industries, and to implement fast mapping of measured spectra in a large-scale spectra database, a new mapping method needs to be launched, and an old full-library searching method needs to be discarded.

Library-mapping-based extraction of geometric parameters of a nano structure includes establishment of a simulation database, and searching in a database. Searching in a database includes searching for a simulation spectrum most similar to a measured spectrum in the database according to certain rules, and is a typical problem of maximum proximity searching. Traditional methods for solving the maximum proximity searching problem include a direct whole-library searching method, a k-d tree method, a clustering analysis method, a local sensitivity hashing and so on. However, no good global optimal result can be obtained when the above-mentioned methods, except for the whole-library searching method, are used to solve problems such as most-similar spectra searching. This is because spectra often have non-obvious characteristics, and these methods make use of one or more characteristics of parameters to be searched. A GPU (Graphic Processing Unit) is also employed to measure mapping of most-similar simulation spectra in a database. The GPU is a hardware acceleration module especially designed for processing images and featuring higher data processing speed, better data processing, and concurrent computation capability with respect to a CPU. Fast mapping of spectra can be achieved by arranging multiple simulation spectra into a matrix denoting spectra images, and thus fast extraction of geometric parameters. However, problems with this method are that, with further expansion of the simulation spectra database, more powerful and high-efficient GPUs must be used, which limits scalability of this category of hardware-acceleration-based searching method.

SUMMARY OF THE INVENTION

In view of the above-described problems, it is one objective of the invention to provide a method for extracting a critical dimension of a semiconductor nanostructure capable of facilitating accurate and fast extraction of feature linewidth, height, and sidewall angles, and featuring a simple process.

To achieve the above objective, in accordance with one embodiment of the invention, there is provided a method for extracting a critical dimension of a semiconductor nanostructure, the method comprising steps of:

(1) determining a value range for each parameter to be extracted, whereby generating an electronic spectra database, and employing training spectra and support vector machine (SVM) training networks for training of SVMs;

(2) employing the SVMs after training to map measured spectra to yield a corresponding electronic spectra database; and (3) employing a searching algorithm to search for an optimum simulation spectrum in the corresponding electronic spectra database, simulation parameters corresponding to the simulation spectrum being the critical dimension of the semiconductor nanostructure to be extracted.

In a class of this embodiment, the electronic spectra database is obtained by:

dividing the value range for each parameter to be extracted into multiple sub-value ranges;

choosing one sub-value range from the sub-value ranges whereby generating a sub-parameter value combination; and extracting multiple groups of discrete values for sub-parameter value ranges in each sub-parameter value combination, employing forward optical modeling program to generate a corresponding simulation spectrum for the discrete values, a simulation spectrum corresponding to all discrete points in each sub-parameter value combination being an electronic spectra database.

In a class of this embodiment, in the process of extracting of the training spectra, each parameter to be extracted corresponds to a SVM, the number of categories contained by an output end of the SVM is determined by that of sub-ranges divided from the value range of each parameter to be extracted, each category is identified by a unique number and used for denoting a sub-range, and corresponds to a training spectra set, and each training spectra set corresponds to a sub-range, by randomly choosing multiple discrete values in a sub-range, and generating a simulation spectrum for each discrete point via the forward optical modeling program, a simulation spectra set, or a training spectra set is generated, and all training spectra contained in training spectra sets corresponding to all output ends of the SVM are training spectra required by the SVM.

In a class of this embodiment, in step (2), an output end of a SVM corresponding to the parameter to be extracted comprises multiple categories, each category corresponds to a sub-range divided from a value range of the parameter to be extracted, by inputting the measured spectra into a SVM, an output of the SVM comprises a category indicating a sub-range of a value range to be extracted corresponding to the SVM, a sub-range of each parameter to be extracted is determined by mapping of a SVM corresponding to each parameter to be extracted, and all sub-ranges uniquely determine the electronic spectra database.

In a class of this embodiment, the searching for an optimum simulation spectrum comprises:
  arranging all spectra in each electronic spectra database into a matrix, each row of the matrix being a simulation spectrum, and the simulation spectrum uniquely corresponding to a group of parameter values;
  calculating evaluation function values with each simulation spectrum and the measured spectra in the matrix from the top down according to an evaluation function; and
  searching for a minimum evaluation function value via the searching algorithm or a sorting algorithm, a simulation spectrum corresponding to the minimum evaluation function value being the optimum simulation spectrum.

Advantages of the method for extracting a critical dimension of a semiconductor nanostructure are summarized below. Compared with a library-mapping-based method for extracting feature dimensions in the prior art, the invention is capable of mapping the measured spectra into a small-range sub-database by adding a process of off-line training using a SVM classifier, and time spent on searching in the sub-database is far less than that on most-similar spectra searching in a large database. In addition, by increasing the number of categories in each classifier (namely dividing value range for each parameter into multiple sub-ranges), a smaller sub-database can be obtained, which further accelerates extraction of the parameters, and the invention also implements predicable and controllable extraction speed of the parameters.

DETAILED DESCRIPTION OF THE EMBODIMENTS

For further illustrating the invention, experiments detailing a method for extracting a critical dimension of a semiconductor nanostructure are described below. It should be noted that the following examples are intended to describe and not to limit the invention.

Figure 1:
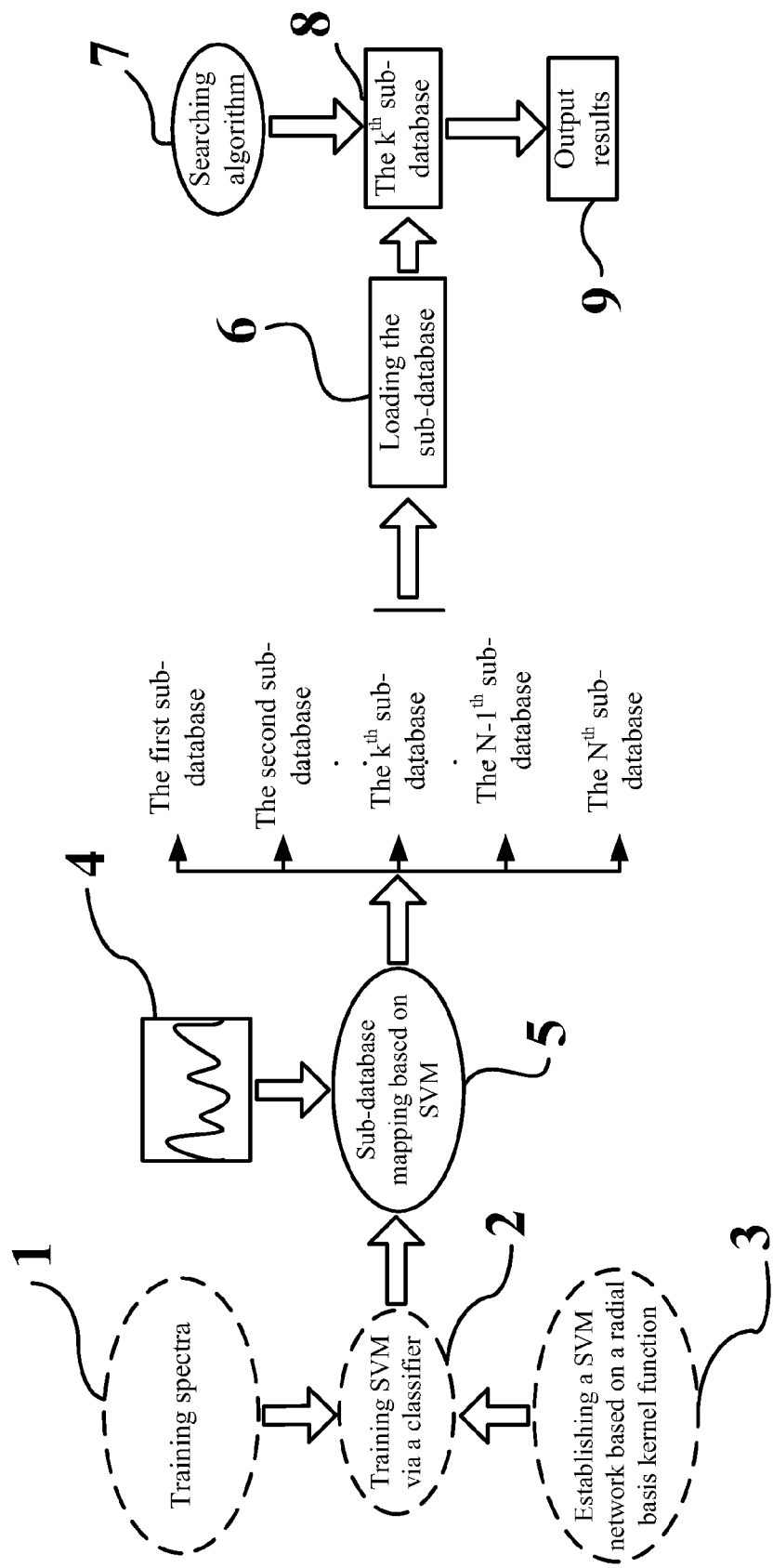
FIG. 1 is a flowchart of a method for extracting a critical dimension of a semiconductor nanostructure of the invention.
Figure 3:
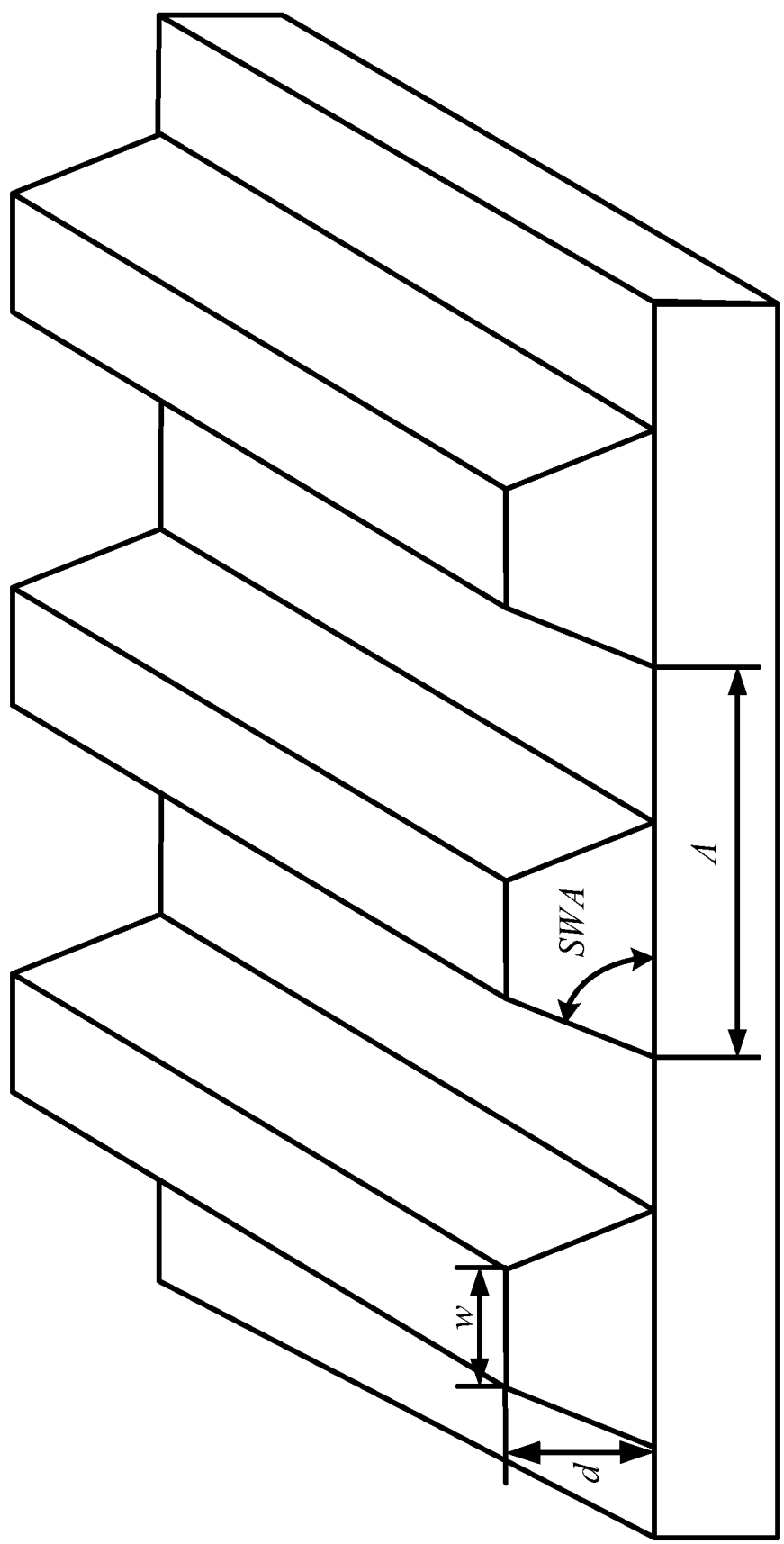
FIG. 3 illustrates a sample to be measured.

As shown in FIG. 1, a method for extracting a critical dimension of a semiconductor nanostructure of the invention comprises steps of (take a one-dimensional trapezoid grating structure as an example):

(1) determining parameters to be extracted of a one-dimensional trapezoid grating structure, and value ranges thereof;

As shown in FIG. 3, a linewidth (w), a line height (depth) and a sidewall angle (SWA) are three parameters to be extracted.

Figure 2:
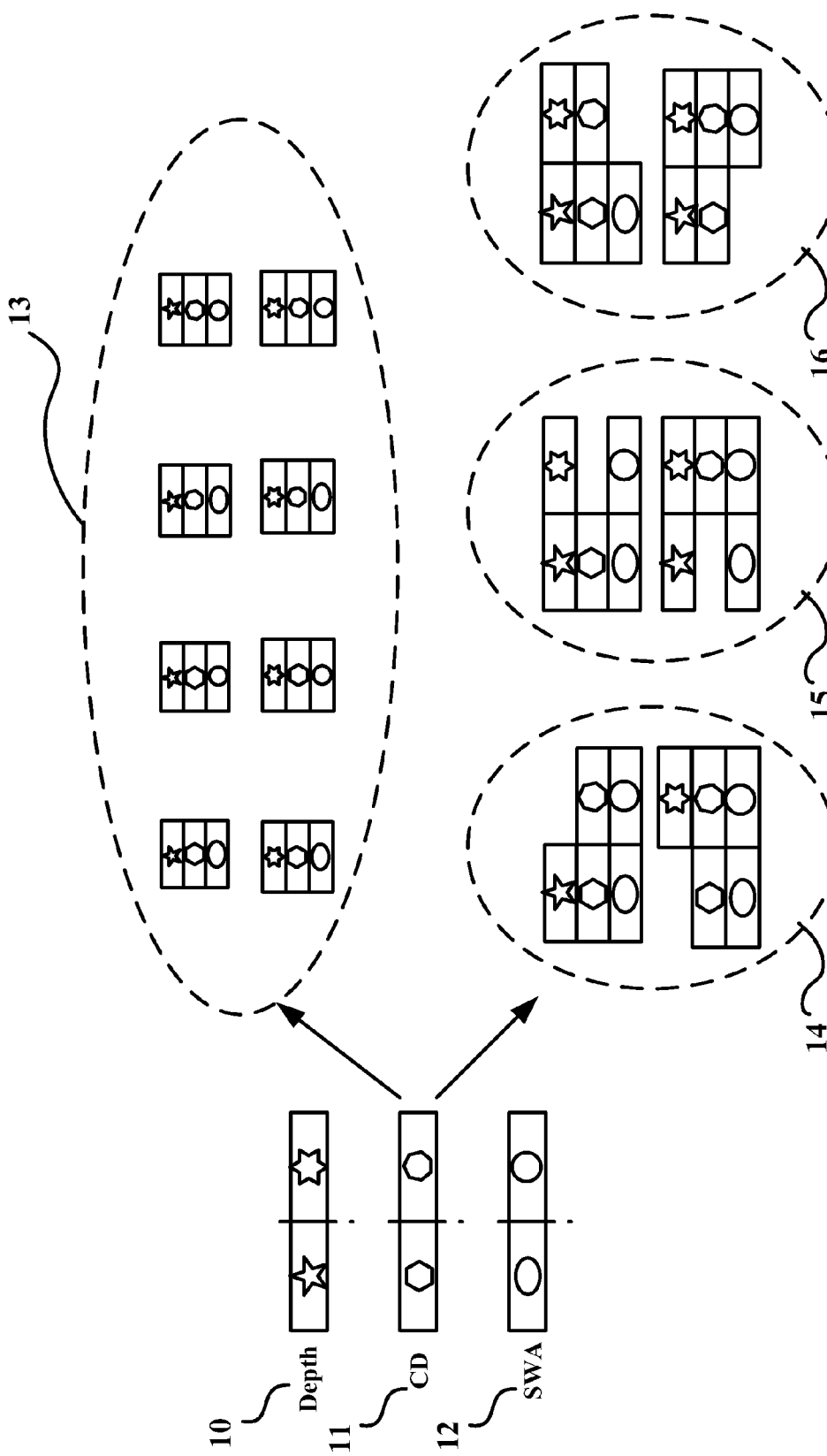
FIG. 2 illustrates establishment of a sub-database, and range division of spectra trained via a classifier.

As shown in FIG. 2, lengths of three rectangles 10, 11 and 12 are respectively used to represent value ranges of the linewidth (w), the line height (depth) and the sidewall angle (SWA).

(2) dividing the value ranges of the parameters whereby obtaining different sub-value ranges, and combining the sub-value ranges;

In details, division can be equivalent division or non-equivalent division, in this example, value ranges of the three parameters to be extracted are divided equivalently.

Training spectra or simulation spectra in an electronic spectra database are obtained using different combinations of sub-value ranges via forward optical modeling, and the training spectra is used for training a Support Vector Machine (SVM). Principle of the forward optical modeling is value or analytic solution based on the Maxwell equation, and the solution comprises a rigorous coupled-wave analysis method, or a finite-difference time-domain method. The forward optical modeling program can use independently-developed program or commercial software on the market, such as RSoft software from the Rsoft company.

As shown in FIG. 2, a value range of each parameter to be extracted is equivalently divided into two parts, and each part is referred to as a sub-value range. To distinguish the two sub-value ranges of each parameter, a unique geometric shape is added to each of the sub-value range: each sub-value range of a lineheight is represented by a five-angle star and a six-angle star disposed therein, each sub-value range of a linewidth is represented by a hexagon and a heptagon disposed therein, and each sub-value range of a sidewall angle is represented by an ellipse and a circle disposed therein.

According to the above division method, six sub-parameter value ranges are obtained for three parameters to be extracted, and each parameter comprises two sub-value ranges. If sub-value ranges for all parameters are combined, eight combinations of sub-parameter value ranges can be obtained, as shown in an ellipse 13 (indicated by a dashed-line) in FIG. 2.

Figure 5:
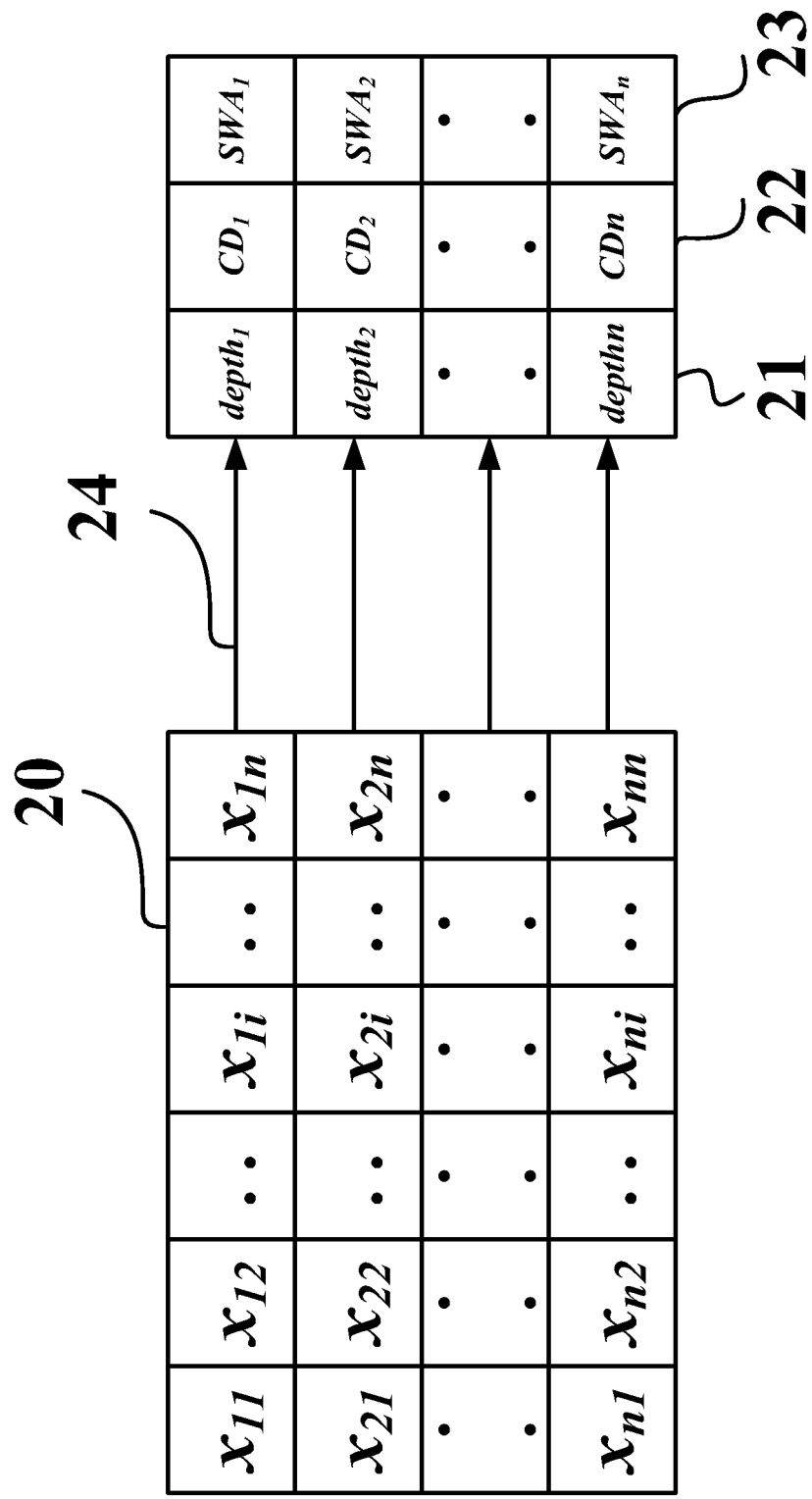
FIG. 5 illustrates storage of spectra in a database.
Figure 6:
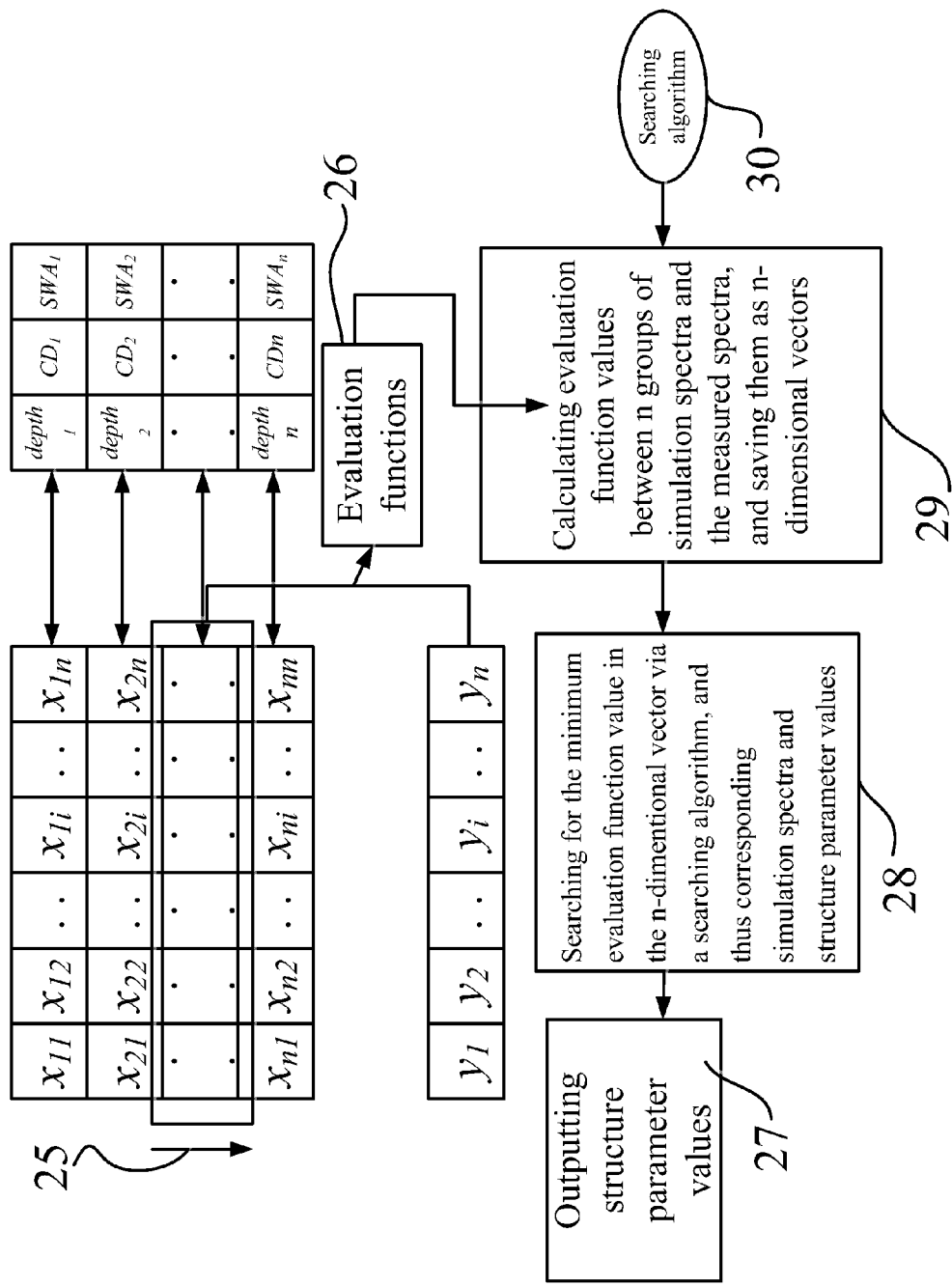
FIG. 6 illustrates mapping and searching of measured spectra in a sub-database.

Each combination represents a value range corresponding to a sub-database. Thus, eight sub-databases are established, namely N=8 (in FIG. 1, k represents one of the sub-databases that determined after the measured spectrum 4 is mapped via a SVM, and training of the SVM and the mapping process are described hereinafter). Discrete values of three sub-parameter value ranges of each combination are taken (namely a continuous value range is discretized into multiple points at an equal distance, for example, a range of 1 to 2 is discretized into 5 points: 1, 1.25, 1.5, 1.75 and 2), and forward optical modeling software is utilized to simulate each combination of discrete values whereby obtaining simulation spectra. Taking the first combination for example, three sub-value ranges are discretized into $k_1$, $k_2$ and $k_3$ parameter values (where $k_1$, $k_2$ and $k_3$ are positive integers greater than or equal to 1, the greater the values are, the more accurate final extraction results will be. In this example $k_1$, $k_2$ and $k_3$ are equal to 20), then $k_1 \times k_2 \times k_3$ parameter models are used to generate corresponding spectra via forward optical modeling, and finally $k_1 \times k_2 \times k_3$ simulation spectra are generated (namely $20^3 = 8000$ simulation spectra are generated in this example), and operate as the first sub-database. Establishment of the rest of the sub-databases is the same as above, and storage of those sub-databases in computers is shown in FIG. 5. The sub-database comprises a spectra storage matrix 20, and corresponding structure parameter storage matrices 21, 22 and 23. In the spectra storage matrix 20, each row thereof represents a simulation spectrum. Elements at each row of the lineheight storage column vector 21, the linewidth storage column vector 22 and the sidewall angle storage column vector 23 respectively correspond to a spectrum in the spectra storage matrix 20, as represented by an arrow 24. Namely, structure parameter values corresponding to a measured spectrum are obtained via the forward optical modeling software.

Figure 4:
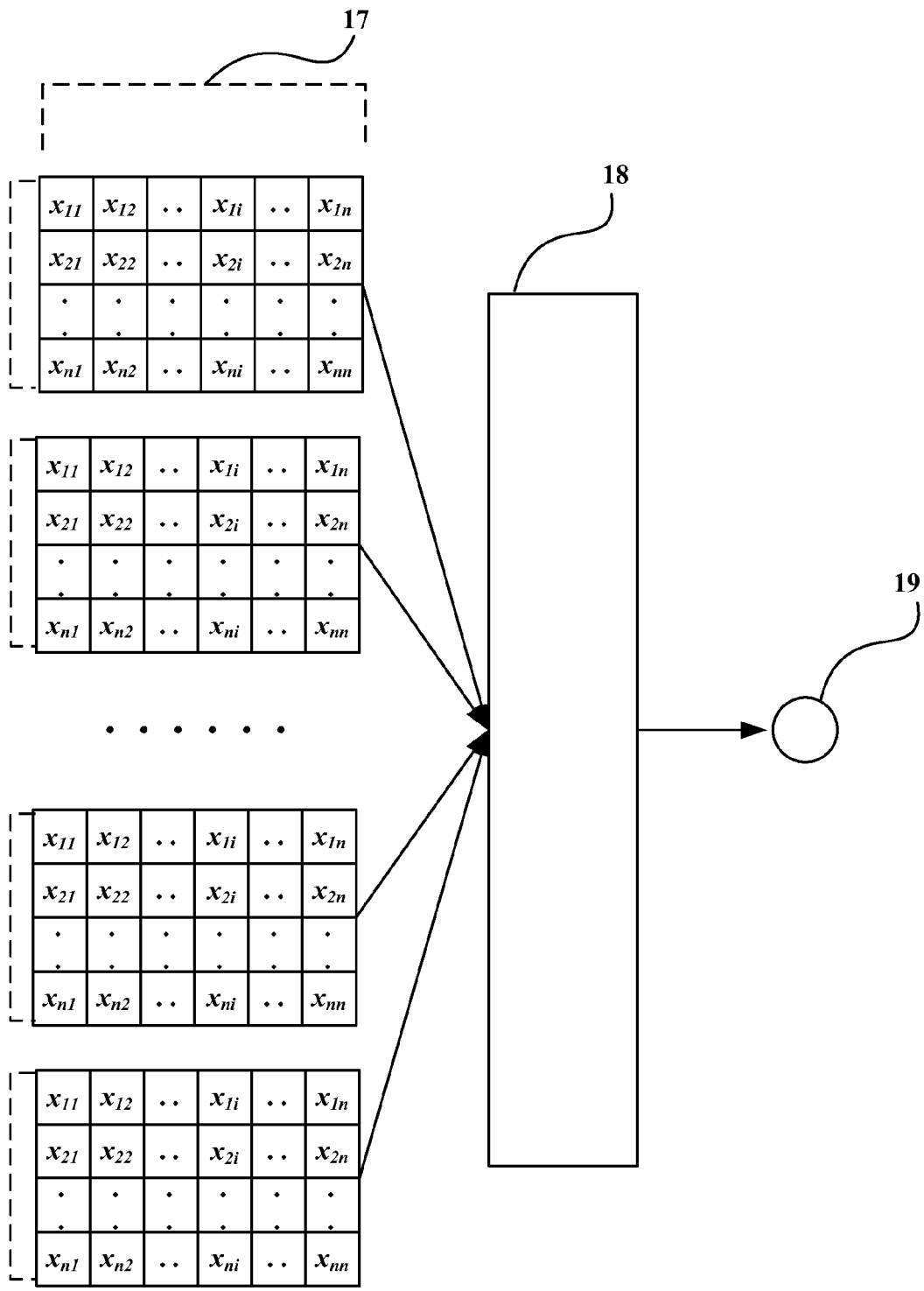
FIG. 4 illustrates a classifier corresponding to a parameter to be extracted.

The number of the parameters to be extracted is three, correspondingly the number of the SVMs is three, and each SVM corresponds to a parameter to be extracted. As shown in FIG. 4, a training spectrum 17 is an input of a SVM training network 18, and output ends thereof comprise M training spectra set, and each set corresponds to training spectra required by each category. The output end 19 is a typical value of each category contained in the classifier.

In FIG. 2, a value range of each parameter is divided into two sub-value ranges, and the SVM corresponding to each parameter is configured to comprise two categories. In the ellipse 14 in FIG. 2, selection of parameter value ranges of each category used by the first SVM is illustrated. In the ellipse 14, in parameter value ranges corresponding to the first category and the second category, value ranges of the linewidth and the sidewall angle are the same, a value range of the lineheight is half of that of the whole lineheight. The same principle applies to the other two ellipses 15 and 16.

Taking the first SVM corresponding to the ellipse 14 for example, since the SVM comprises two categories, each category has a corresponding combination of parameter value ranges, different parameter values are randomly selected from combinations of parameter value ranges corresponding to each category whereby forming models each with a determined parameter value (namely each model comprises an unique lineheight, linewidth, and sidewall angle), and the number of the models can be freely set, but must be greater than 500 (in this example, the number is set to 1500). The forward optical modeling software is used to generate a corresponding training spectrum for each model, and thus each category has a corresponding training spectra set. In this example, each SVM corresponds to two training spectra sets, and these two sets (indicated by 17 in FIG. 4) have 3000 training spectra. Since FIG. 2 only consider a two-category problem, an output value of 0 or 1 of the SVM is used as a typical value for each category, the generated training spectra are used as inputs, a vector [0 1] is used as an output parameter, as indicated by 19 in FIG. 4. The SVM training network 18 in FIG. 4 is used for training the training spectra 17 and the output vector 19. The training method of the SVM can employ a least square method or a dynamic programming method. In this example, the dynamic programming method is used, and a radial basis kernel function is used as a kernel function of the SVM, and represented by:

$$\psi(x) = \exp\left[-\frac{\|x - x_c\|^2}{2 \times \sigma^2}\right] \quad (1)$$

Where x is a vector to be classified (in this example x represents a measured spectrum), $x_c$ is a central value (in this example is equal to 0) of a radial basis kernel function $\psi(x)$, $\sigma$ is a scaling factor (in this example is equal to 1.5). The SVM after training is used for classification recognition of the measured spectrum.

In FIG. 2, a value range of a parameter to be extracted is divided into two sub-value ranges. It should be noted that in practice, the value range can be divided into multiple sub-ranges, and combination of the sub-ranges, generation of the sub-database, and the training method of the SVM are the same as FIG. 2.

(3) obtaining measured spectra;

The measured spectra comprise reflectance spectra, ellipsometric spectra, and Muller matrix spectra. In this example, the measured spectra use ellipsometric spectra, and are obtained by measuring the sample via ellipsometry equipment.

(4) Mapping the measured spectra by the SVM after training. Mapping of each SVM determines a sub-range of a structure parameter corresponding to the measured spectrum, and thus a corresponding sub-database.

For the three SVMs generated in step (2), each classifier corresponds to one of the parameters to be extracted: the lineheight, the linewidth, and the sidewall angle. By mapping the measured spectrum obtained in step (3) via a classifier corresponding to the lineheight, it is possible to determine a sub-value range of a true value of a lineheight corresponding to the spectrum; also, by mapping the measured spectrum via classifiers corresponding to the linewidth and the sidewall angle, it is possible to determine a sub-value range of a true value of a linewidth and the sidewall angle corresponding to the spectrum. Once all sub-value ranges of the parameters to be extracted and corresponding to the measured spectra are determined, it is possible to find the sub-database corresponding to the sub-value ranges.

(5) selecting an evaluation function and using the measured spectra obtained in step (3) to obtain comparison results in the spectra storage matrix in the sub-database determined in step (4), calculating an evaluation function value corresponding to each comparison result, finding the minimum evaluation function value, and determining a group of structure parameter values according to a simulation spectrum corresponding to the minimum evaluation function value, the structure parameter values being most similar to true values of the measured spectra.

Conventional evaluation functions comprise:

a minimum distance evaluation function: an evaluation function value ED thereof is represented as:

$$ED = \sqrt{\frac{1}{n}\sum_{i=1}^{n}(s_{ui} - s_{ri})^2} \quad (2)$$

where n is a dimension of spectra, $S_{ui}$ is a spectral point in a measured spectrum corresponding to an unknown structure to be measured, $S_{ri}$ is a spectral point of a simulation spectrum $S_r$ in an electronic spectra database.

(2) A spectral angle evaluation function: an evaluation function value θ thereof is represented as:

$$\theta = \cos^{-1} \frac{\sum_{i=1}^{n} s_{ui} \times s_{ri}}{\sqrt{\sum_{i=1}^{n} s_{ui}^2} \times \sqrt{\sum_{i=1}^{n} s_{ri}^2}} \quad (3)$$

Spectral angle mapping is constant for multiplier interference, only similarity of spectra in terms of shapes is compared, and the mapping is irrelevant to norm of spectral vectors.

(3) A spectral correlation evaluation function: an evaluation function value SCM thereof is represented as:

$$SCM = \frac{n \sum_{i=1}^{n} s_{ui} \times s_{ri} - \sum_{i=1}^{n} s_{ui} \sum_{i=1}^{n} s_{ri}}{\sqrt{n \sum_{i=1}^{n} s_{ui}^2 - \left(\sum_{i=1}^{n} s_{ui}\right)^2} \sqrt{n \sum_{i=1}^{n} s_{ri}^2 - \left(\sum_{i=1}^{n} s_{ri}\right)^2}} \quad (4)$$

(4) A spectral similarity evaluation function: an evaluation function value SSS thereof is represented as:

$$SSS = \sqrt{\left(\sqrt{\frac{1}{n} \sum_{i=1}^{n} (s_{ui} - s_{ri})^2}\right)^2 + \left(\cos \frac{\sum_{i=1}^{n} s_{ui} \times s_{ri}}{\sqrt{\sum_{i=1}^{n} s_{ui}^2} \times \sqrt{\sum_{i=1}^{n} s_{ri}^2}}\right)^2} \quad (5)$$

(5) A spectral information separability evaluation function: spectra vectors are used as random vectors, and similarity between two random vectors is analyzed via the probability theory. Defining the $i^{th}$ component of the spectral vector $s_u$ $$p_i(s_u) = s_{ui} \Big/ \sum_{k=1}^{n} s_{uk},$$

where n is a dimension of the spectra, then information entropy of $s_u$ with respect to a simulation spectrum $S_r$ in the spectra database $$D(x \| y) = \sum_{i=1}^{n} p_i(s_u) \log\left(\frac{p_i(s_u)}{p_i(s_r)}\right),$$

the evaluation function value is a spectral information divergence, and is defined as:

$$SID = D(x\|y) + D(y\|x) \quad (6)$$

SID represents information difference between two spectra, the closer to 0 a value thereof is, the greater the similarity between two spectra will be.

An evaluation function 26 is selected from the above-mentioned evaluation functions (in this example, the minimum distance evaluation function in equation (2) is selected), evaluation function values between each measured spectrum and the simulation spectra are calculated from an order 25 from the top down via the evaluation function in the sub-database in step (4), and arranged into an evaluation function value vector 29, then the minimum in the vector 29, and a simulation spectrum and a structure parameter value 28 are determined according to an order or a searching algorithm 30, and finally, the structure parameter value 27 is output.

As shown in FIG. 1, a method for extracting a critical dimension of a semiconductor nanostructure comprises steps of: training the SVM 2 via the training spectra 1 and the SVM training network 3, mapping a measured spectrum 4 via the SVM after training 5, a mapping result being a corresponding electronic spectra database, loading the electronic spectra database into a computer memory 6, searching for a group of optimum simulation spectra in the electronic spectra database loaded into the computer memory via a searching algorithm 7, a simulation structure parameter value corresponding to the simulation spectra being the critical dimension 9 of the semiconductor nanostructure to be extracted.

Key points of the fast and controllable searching method of the spectra database of the invention are training of the SVM, different classification methods, and difference between training spectra sets, and selection of the training kernel function and the training method greatly affect reliability of the SVM. The training methods of SVM of the invention ensure reasonable training of the SVM and reliable classification of final results thereof.

In the above description of the invention, although only extraction of three parameters: lineheights, linewidths and sidewall angles of the one-dimensional trapezoid grating structure are taken as an example, and equivalent division during division of parameter ranges is described, it should be noted that for other types of periodic grating structure (such as two-dimensional periodic grating, overlay structure and so on), or in case that a large number of parameters are to be extracted, the same parameter division method, sub-database generation method and SVM training method as above can also be used.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A method for extracting a critical dimension of a semiconductor nanostructure, the method comprising:
   1) determining a value range for each parameter to be extracted, whereby generating an electronic spectra database, and employing training spectra and support vector machine (SVM) training networks for training of SVMs;
   2) employing said SVMs after training to map measured spectra to yield a corresponding electronic spectra database; and
   3) employing a searching algorithm to search for an optimum simulation spectrum in said corresponding electronic spectra database, simulation parameters corresponding to said optimum simulation spectrum being the critical dimension of the semiconductor nanostructure to be extracted;
   wherein said electronic spectra database is obtained by:
   a) dividing said value range for each parameter to be extracted into multiple sub-value ranges;
   b) choosing one sub-value range from said sub-value ranges whereby generating a sub-parameter value combination; and c) extracting multiple groups of discrete values for sub-parameter value ranges in each sub-parameter value combination, employing forward optical modeling program to generate a corresponding simulation spectrum for said discrete values, a simulation spectrum corresponding to all discrete points in each sub-parameter value combination being an electronic spectra database.

2. A method for extracting a critical dimension of a semiconductor nanostructure, the method comprising:
1) determining a value range for each parameter to be extracted, whereby generating an electronic spectra database, and employing training spectra and support vector machine (SVM) training networks for training of SVMs;
2) employing said SVMs after training to map measured spectra to yield a corresponding electronic spectra database; and
3) employing a searching algorithm to search for an optimum simulation spectrum in said corresponding electronic spectra database, simulation parameters corresponding to said optimum simulation spectrum being the critical dimension of the semiconductor nanostructure to be extracted;

wherein in the process of extracting of said training spectra, each parameter to be extracted corresponds to a SVM, the number of categories contained by an output end of said SVM is determined by that of sub-ranges divided from said value range of each parameter to be extracted, each category is identified by a unique number and used for denoting a sub-range, and corresponds to a training spectra set, and each training spectra set corresponds to a sub-range, by randomly choosing multiple discrete values in a sub-range, and generating a simulation spectrum for each discrete point via said forward optical modeling program, a simulation spectra set, or a training spectra set is generated, and all training spectra contained in training spectra sets corresponding to all output ends of said SVM are training spectra required by said SVM.

3. A method for extracting a critical dimension of a semiconductor nanostructure, the method comprising:
1) determining a value range for each parameter to be extracted, whereby generating an electronic spectra database, and employing training spectra and support vector machine (SVM) training networks for training of SVMs;
2) employing said SVMs after training to map measured spectra to yield a corresponding electronic spectra database; and
3) employing a searching algorithm to search for an optimum simulation spectrum in said corresponding electronic spectra database, simulation parameters corresponding to said optimum simulation spectrum being the critical dimension of the semiconductor nanostructure to be extracted;

wherein in step (2), an output end of a SVM corresponding to said parameter to be extracted comprises multiple categories, each category corresponds to a sub-range divided from a value range of said parameter to be extracted, by inputting said measured spectra into a SVM, an output of said SVM comprises a category indicating a sub-range of a value range to be extracted corresponding to said SVM, a sub-range of each parameter to be extracted is determined by mapping of a SVM corresponding to each parameter to be extracted, and all sub-ranges uniquely determine said electronic spectra database.

4. A method for extracting a critical dimension of a semiconductor nanostructure, the method comprising:
1) determining a value range for each parameter to be extracted, whereby generating an electronic spectra database, and employing training spectra and support vector machine (SVM) training networks for training of SVMs;
2) employing said SVMs after training to map measured spectra to yield a corresponding electronic spectra database; and
3) employing a searching algorithm to search for an optimum simulation spectrum in said corresponding electronic spectra database, simulation parameters corresponding to said optimum simulation spectrum being the critical dimension of the semiconductor nanostructure to be extracted;

wherein said searching for an optimum simulation spectrum comprises:
a) arranging all spectra in each electronic spectra database into a matrix, each row of said matrix being a simulation spectrum, and said simulation spectrum uniquely corresponding to a group of parameter values;
b) calculating evaluation function values with each simulation spectrum and said measured spectra in said matrix from the top down according to an evaluation function; and
c) searching for a minimum evaluation function value via said searching algorithm or a sorting algorithm, a simulation spectrum corresponding to said minimum evaluation function value being said optimum simulation spectrum.

\* \* \* \* \*